United States Patent [19]

Obinata

[11] 4,202,230

[45] May 13, 1980

[54] ROTARY CUTTER

[75] Inventor: Akira Obinata, Fujinomiya, Japan

[73] Assignee: Fuji Photo Film Co., Ltd., Minami-ashigara, Japan

[21] Appl. No.: 925,337

[22] Filed: Jul. 17, 1978

[30] Foreign Application Priority Data

Jul. 15, 1977 [JP] Japan .................................. 52-84696

[51] Int. Cl.² .......................... B26D 1/40; B23D 25/02

[52] U.S. Cl. ........................................................ 83/345

[58] Field of Search .................... 83/345, 37, 343, 344

[56] References Cited

U.S. PATENT DOCUMENTS

| | | | |
|---|---|---|---|
| 3,143,022 | 8/1964 | Andersen | 83/345 X |
| 3,354,768 | 11/1967 | Lick | 83/345 |
| 3,638,522 | 2/1972 | Bolli | 83/345 |
| 4,108,033 | 8/1978 | Bembenek | 83/345 X |

*Primary Examiner*—Donald R. Schran

*Attorney, Agent, or Firm*—Sughrue, Rothwell, Mion, Zinn and Macpeak

[57] ABSTRACT

The present invention relates to a rotary cutter for rounding the corners of a sheet cut from, for example, a continuous web. The rotary cutter is provided with two blades adapted to be brought into engagement with each other while each blade is rotated by a separate parallel shaft. The rotary cutter satisfies three conditions: the first and second blades have the same blade contours with respect to a common curved edge line defining a plane; each blade at each position of engagement satisfies the relationship of $\beta \geqq \alpha$, where $\beta$ is the relief angle of each blade and $\alpha$ is the nip angle of each blade; $R_1/R_2 = AA'/AA''$, where $R_1$ is the radius of rotation of the first blade, $R_2$ is the radius of rotation of the second blade, AA' is the edge line length of the first blade, and AA'' is the edge line length of the second blade.

1 Claim, 4 Drawing Figures

ROTARY CUTTER

BACKGROUND OF THE INVENTION

1. Field of the Invention

This invention relates to an improved rotary cutter, and, more particularly, to a rotary cutter which is capable of rounding the corners of a cut sheet when cutting a web into a sheet of a desired length.

2. Description of the Prior Art

As a method for cutting a web into sheets of a desired length, it is well known to use a pivotally moved cutter having an upper blade which is moved pivotally with respect to a stationary lower blade. Improved cutting efficiency can be achieved, however, by the use of a rotary cutter.

The pivotally moved cutter exhibits many disadvantages including a large variation in load in the mechanical portions and a low accuracy in the cutting operation, both of which are due to the pivotal movement of the movable blade.

The rotary cutter, on the other hand, exhibits the capability of continuous cutting of a web at a high cutting speed, as compared with that by the pivotally moved cutter, with a resultant improved cutting capability per unit time. The conventional rotary cutter utilizes a linear contour for each blade, and thus, provides a cut sheet having a linear cut edge. However, in order to provide rounded corners to a sheet cut by such a conventional rotary cutter, the cut sheet must be subjected to a separate punching or rounding step.

SUMMARY OF THE INVENTION

Accordingly, it is an object of the present invention to provide a rotary cutter which is capable of cutting a web to a desired length, and at the same time, of rounding the corners of the sheet cut from the web.

In order to cut a web into a sheet having round corners by means of the above-described rotary cutter, each blade of the rotary cutter must be rounded in the portion serving to cut each longitudinal edge of the web. However, the inclusion of the rounding curves in the contour of each rotary cutter blade results in interference between the blades.

The present invention relates to a rotary cutter for rounding the corners of a sheet cut from, for example, a continuous web. The rotary cutter is provided with two blades adapted to be brought into engagement with each other while each blade is rotated by a separate parallel shaft. The rotary cutter satisfies three conditions: the first and second blades have the same blade contours with respect to a common curved edge line defining a plane; each blade at each position of engagement satisfies the relationship of $\beta > \alpha$, where $\beta$ is the relief angle of each blade and $\alpha$ is the nip angle of each blade; $R_1/R_2 = AA'/AA''$, where $R_1$ is the radius of rotation of the first blade, $R_2$ is the radius of rotation of the second blade, AA' is the edge line length of the first blade, and AA" is the edge line length of the second blade.

DETAILED DESCRIPTION OF THE PREFERRED EMBODIMENTS

Figure 1:
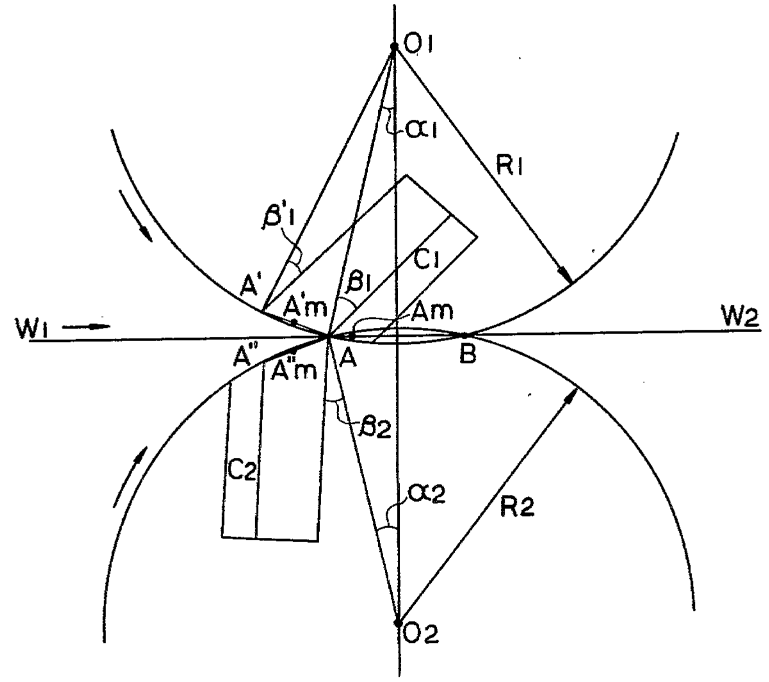
FIG. 1 is a diagrammatic cross-sectional side view of the rotary cutter of the present invention showing the geometrical parameters of the two cutter blades $C_1$ and $C_2$.
Figure 2:
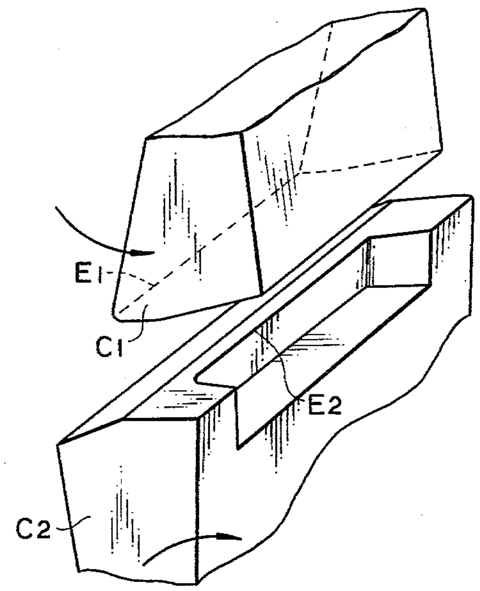
FIG. 2 is a perspective view showing a partial physical configuration of each blade contour including curved portions of the rotary cutter, as shown in FIG. 1.

Referring now to FIG. 1, the relationship between an upper blade $C_1$ and a lower blade $C_2$ is mutually dependent. The upper and lower blades $C_1$, $C_2$ are fixedly mounted by means of jigs (not shown) on shafts rotatable about axes 01 and 02, respectively, and the radius of rotation of the upper blade and that of the lower blade are represented by $R_1$ and $R_2$, respectively. Reference symbols A and B represent points of intersection of the circle defined by the peripheral edge of rotating upper blade C1 with the circle defined by the peripheral edge of rotating lower blade $C_2$.

The angle $\alpha_1$ formed by the line connecting axes 01, 02, and the line connecting the axis 01 to the engaging point of one blade edge with another blade edge when upper blade $C_1$ and lower blade $C_1$ are brought into engagement with each other at point A, as shown in FIG. 1, is designated as nip angle $\alpha_1$. Similarly, the angle $\alpha_2$ formed by the line connecting axes 01, 02, and the line connecting the axes 02 to the engaging point of one blade edge with another blade edge when the upper blade $C_1$ and the lower blade $C_2$ are brought into engagement with each other at point A, as shown in FIG. 1, is designated as nip angle $\alpha_2$.

The angle $\beta_1$ formed by the line connecting the axis 01 to the engaging point of one blade edge with another blade edge when the upper blade $C_1$ and the lower blade $C_2$ are brought into engagement with each other at point A, as shown in FIG. 1, and the line parallel to the blade surface of upper blade $C_1$ is designated as relief angle $\beta_1$. Similarly, the angle $\beta_2$ formed by the line connecting the axis 02 to the engaging point of one blade edge with another blade edge when the upper blade $C_1$ and the lower blade $C_2$ are brought into engagement with each other at point A, as shown in FIG. 1, and the line parallel to the blade surface of upper blade $C_1$ is designated as relief angle $\beta_2$.

The approach of the present invention to prevent trochoidal interference, that is to say, the interference of the upper blade with the lower blade, is now explained. The interference of upper blade $C_1$ with lower blade $C_2$ may be avoided by orienting these blades in such a manner that the edge line of the upper blade $C_1$ does not pass beyond the edge line of the lower blade $C_2$, and vice versa, at a desired point between the points of engagement A and B of one blade with another. Thus, the interference of one blade with another may be prevented by determining the configurations of the upper and lower blades $C_1$ and $C_2$, so that the configurations satisfy the relationships of $\beta_1 \geqq \alpha_1$ and $\beta_2 \geqq \alpha_2$, respectively.

Figure 3:
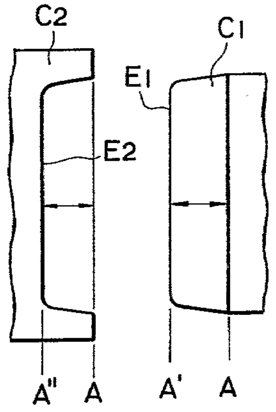
FIG. 3 is a partial top plan view showing the physical configuration of each blade of the rotary cutter, as shown in FIG. 1; and, FIG. 4 is a top plan view showing the rounded portions cut when the web is cut to the desired length by the rotary cutter of the present invention.

In the case when a curve is included in the blade configuration, a long edge length is produced. For example, in FIG. 3, line $\overline{AA'}$ represents the long edge length of the upper blade $C_1$. Relief angles $\beta_1$ and $\beta_1'$ formed in the upper blade $C_1$ at the edges A and A' therefore satisfy the condition of $\beta_1 > \beta_1'$ because the relief planes of upper blade $C_1$ are in parallel. As such, the upper blade $C_1$ must satisfy the relationship of $\beta_1 \geqq \alpha_1$. Lower blade $C_2$ is at the minimum value for relief angle $\beta_2$ at the starting point of engagement A. At the starting point of engagement A the lower blade must satisfy the relationship of $\beta_2 \geqq \alpha_2$.

In the case when the radius of rotation $R_1$ of upper blade $C_1$ and the radius of rotation $R_2$ of lower blade $C_2$ are equal, then it follows that $\alpha_1 = \alpha_2$ and $\beta_1 = \beta_2$. In this case, the interference of one blade with the other blade is prevented when the relationship of $\beta \geqq \alpha$ is satisfied. In other words, if the relationship of $\beta \geqq \alpha$ is satisfied, interference of the upper blade $C_1$ with the lower blade $C_2$ is prevented at any point between the points of intersection A and B. In the case when the upper and lower blades $C_1$, $C_2$ have equal radii of rotation and angular velocities, the upper and lower blades $C_1$, $C_2$ are brought into engagement with each other at the point of intersection A, and intersect with each other at point B. In such a case if the blades are not matched properly, one blade will impinge on the other, causing damage and shortened service life to the blades.

Such interference between the upper blade $C_1$ and the lower blade $C_2$ may be avoided if the following conditions are satisfied: the radius of rotation of the upper blade $C_1$ is made to be different from the radius of rotation of the lower blade $C_2$; the outer peripheral surface of blade $C_1$ and the outer peripheral surface of blade $C_2$ are made to be flat; and the ratio of the radius of rotation of the upper blade $C_1$ to the radius of rotation of the lower blade $C_2$, i.e., $R_1/R_2$, is made to be equal to the ratio of the edge length AA' of the upper blade $C_1$ to the edge length AA" of the lower blade $C_2$. If these three conditions are met, the upper blade $C_1$ and lower blade $C_2$ are brought into engagement with each other in a symmetrical relationship with respect to the point of intersection at a rate of 1:1 over the entire engagement range from the starting point of engagement A to the terminal point B thereof.

The technical reason why the outer peripheral surface of each blade portion must be made to be flat is that, in the case where the contours of the upper and lower blades $C_1$, $C_2$ include rounded corner portions, the curves of the upper and lower blades $C_1$, $C_2$ which correspond to the rounded corner portions can be brought into accurate engagement with each other.

Figure 4:
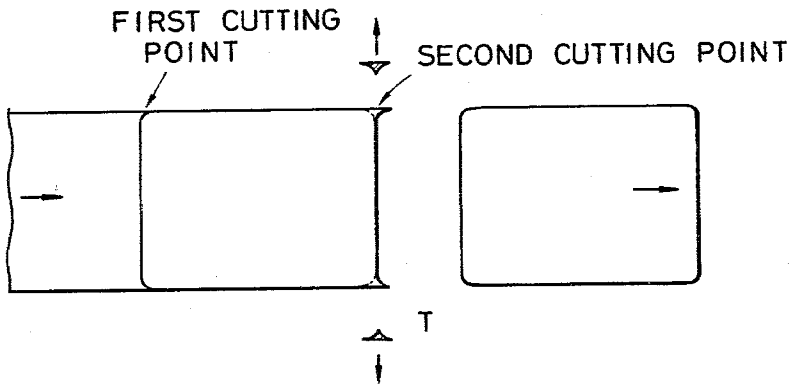

When the continuous web to be cut is transported in the $W_1$-$W_2$ direction and passes the points of engagement A and B between both blades, it is cut in the following manner, as shown with reference to FIGS. 1 and 4. Engagement of blade $C_1$ with blade $C_2$ starts at point A. Because the upper and lower blades $C_1$ and $C_2$ are provided with a flat blade surface, the point of engagement of upper blade $C_1$ with the lower blade $C_2$ is shifted from point A to the point A'm until the portions A'm and A"m of respective blade edges are brought into engagement with each other. This accounts for the first half of the engagement relationship of the upper and the lower blades $C_1$, $C_2$. In the second half, the point of engagements shifts from point A'm back to point A. The point of engagement of the upper blade $C_1$ with the lower blade $C_2$, thus, changes in the manner of A→A'm→A, and the cutting of the web is effected at points between A and A'm. It should be noted that the web is transported at a speed commensurate with the linear velocity of each blade by means of a driving system (not shown) provided separately from the driving system for the upper and lower blades $C_1$, $C_2$.

The rotary cutter of the present invention preferably comprises two pairs of blades disposed along a web passage at an axis-to-axis spacing less than a length of a web to be cut. FIG. 4 shows the process of cutting the continuous web. The rotary cutter disposed at the second cutting point has blades of a reversed shape to that of the rotary cutter disposed at the first cutting point, so that the rotary cutter at the second cutting point may cut in a rounded fashion the angulated corners of a portion of web, as shown by broken lines in FIG. 4.

Referring to the cutting process in greater detail, immediately after rotary cutter has finished cutting a predetermined length from the web having rounded corners, the second rotary cutter cuts the corners of web at the leading end thereof: cuts the T corners from the web. Subsequently, the web is cut to the desired length at the first cutting point by means of the first rotary cutter of the two pair of blades, whereby a sheet having four round cut corners is obtained. After the completion of the cutting operation, the continuous web is advanced to undergo a subsequent cutting operation. Thus, sheets of a desired length are continuously cut from the web and the cut sheets have rounded corners.

According to the rotary cutter of the present invention, the upper blade $C_1$ and the lower blade $C_2$ are arranged to satisfy the relationship of $\beta_1 \geqq \alpha_1$, $\beta_2 \geqq \alpha_2$. In addition, the ratio of the radius of rotation of the upper blade $C_1$ to the radius of rotation of the lower blade $C_2$, i.e., $R_1/R_2$, is made to be equal to the ratio of the effective edge length of upper blade $C_1$ to the effective edge length of the lower blade $C_2$, i.e., AA'/AA", such that the rotary cutter can cut the continuous web into sheets of desired length having curved corners, without any undesired interference occurring between the two blades during engagement. Elimination of the undesired interference between the two blades in the rotary cutter of the present invention results in intended service life of each blade.

Furthermore, since a radius of rotation of one of the blades is made to be different from the radius of rotation of the other blade, one of the blades starts moving prior to the other blade during engagement, and the sliding action of one of the blades relative to another blade imparts an improved sharpness to the blades of the rotary cutter.

The above description has been directed at the case when the blade contours includes a rounded section in the corner portions. The blade contour is not limited thereto, but may include a curve in the linear portion of each blade, and the same cutting efficiency can be achieved by the rotary cutter of the present invention.

What is claimed is:

1. A rotary cutter for cutting from a web a sheet and simultaneously cutting rounded corners on the sheet, said cutter having a first blade and a second blade, said first blade fixedly mounted to a first rotatable shaft and said second blade fixedly mounted to a second rotatable shaft, said first and second rotatable shafts being parallel to each other and spaced apart, said first and second blades adapted to be brought into cutting engagement wth each other when said two shafts are rotated so as to cut from the web a sheet of desired length, the rotary cutter satisfying the following conditions:

(a) said first and second blades having the same blade contours with respect to a common curved edge line defining a plane;

(b) each blade at each position of engagement satisfying the relationship of $\beta \geqq \alpha$; and $$R_1/R_2 = AA'/AA'' \quad (c)$$

wherein:

$\beta$ is the relief angle of each blade,
$\alpha$ is the nip angle of each blade,
$R_1$ is the radius of rotation of the first blade,
$R_2$ is the radius of rotation of the second blade,
AA' is the edge line length of the first blade, and
AA'' is the edge line length of the second blade.

* * * * *